United States Patent [19]
Ara

[11] Patent Number: 6,008,596
[45] Date of Patent: Dec. 28, 1999

[54] CONVERGENCE ADJUSTMENT METHOD AND CONVERGENCE ADJUSTMENT CIRCUIT

[75] Inventor: Koichi Ara, Tokyo, Japan

[73] Assignee: NEC Corporation, Tokyo, Japan

[21] Appl. No.: 08/956,288

[22] Filed: Oct. 23, 1997

[30] Foreign Application Priority Data

Oct. 23, 1996 [JP] Japan ................................. 8-279774

[51] Int. Cl.$^6$ ................................ G09G 1/28; H01J 29/51; H04N 9/28
[52] U.S. Cl. ................................ 315/368.11; 315/368.12
[58] Field of Search .................... 315/368.11, 368.12, 315/368.13, 368.18, 745, 746, 747, 807

[56] References Cited

U.S. PATENT DOCUMENTS

| | | | |
|---|---|---|---|
| 4,401,922 | 8/1983 | Kamata et al. ................ | 315/368.13 |
| 4,672,275 | 6/1987 | Ando ............................ | 315/368.12 |
| 4,816,908 | 3/1989 | Colineau et al. ............ | 348/747 |
| 5,272,421 | 12/1993 | Kimura et al. ............... | 315/368.12 |
| 5,506,481 | 4/1996 | Wada et al. .................. | 315/368.12 |
| 5,576,774 | 11/1996 | Hosoi et al. ................. | 348/745 |
| 5,790,210 | 8/1998 | Kim et al. .................... | 348/807 |
| 5,793,447 | 8/1998 | Fujiwara et al. ............ | 348/807 |

FOREIGN PATENT DOCUMENTS

57-37979  3/1982  Japan .
9-291089  12/1991  Japan .

Primary Examiner—Edward P. Westin
Assistant Examiner—Nikita Wells
Attorney, Agent, or Firm—Foley & Lardner

[57] ABSTRACT

A convergence adjusting method and a convergence adjusting circuit, for improving the preciseness of adjustment while reducing a time required for the adjustment and for avoiding an occurrence of non-continuity distortion on a display screen. An adjustment state flag memory 8 stores flags indicative of whether or not the adjustment in respective adjustment points is completed. The convergence adjusting method includes sequentially performing convergence adjustment at a plurality of adjusting points set on the display screen equidistantly and setting new adjusting points on the display screen equidistantly with a pitch smaller than a pitch of the adjusting points.

22 Claims, 8 Drawing Sheets

Fig. 2

| 1 | 0 | 0 | 0 | 1 | 0 | 0 | 0 | 1 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 1 | 0 | 0 | 0 | 1 | 0 | 0 | 0 | 1 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 1 | 0 | 0 | 0 | 1 | 0 | 0 | 0 | 1 |

000# CONVERGENCE ADJUSTMENT METHOD AND CONVERGENCE ADJUSTMENT CIRCUIT

FIELD OF THE INVENTION

The present invention relates to a convergence adjustment method and a convergence adjustment circuit and, particularly, to a convergence adjustment method and a convergence adjustment circuit for use in a color display device.

DESCRIPTION OF THE PRIOR ART

In the high definition direct view CRT display or the 3-tube projector, a convergence correction circuit is required to converge three discrete images of primary colors R, G and B into a point on a front surface of a CRT or a screen. A digital convergence circuit has been known, in which, in order to easily perform the convergence adjustment with high precision, a screen is divided into an arbitrary number of adjustment regions and a convergence of three primary color images is performed in each adjustment region.

In general, the convergence adjustment is performed on the surface of the CRT in the direct view display or on the screen in the projector. The CRT surface or the projector screen will be referred to as merely "screen", hereinafter.

Now, a conventional digital convergence circuit will be described.

Figure 7:
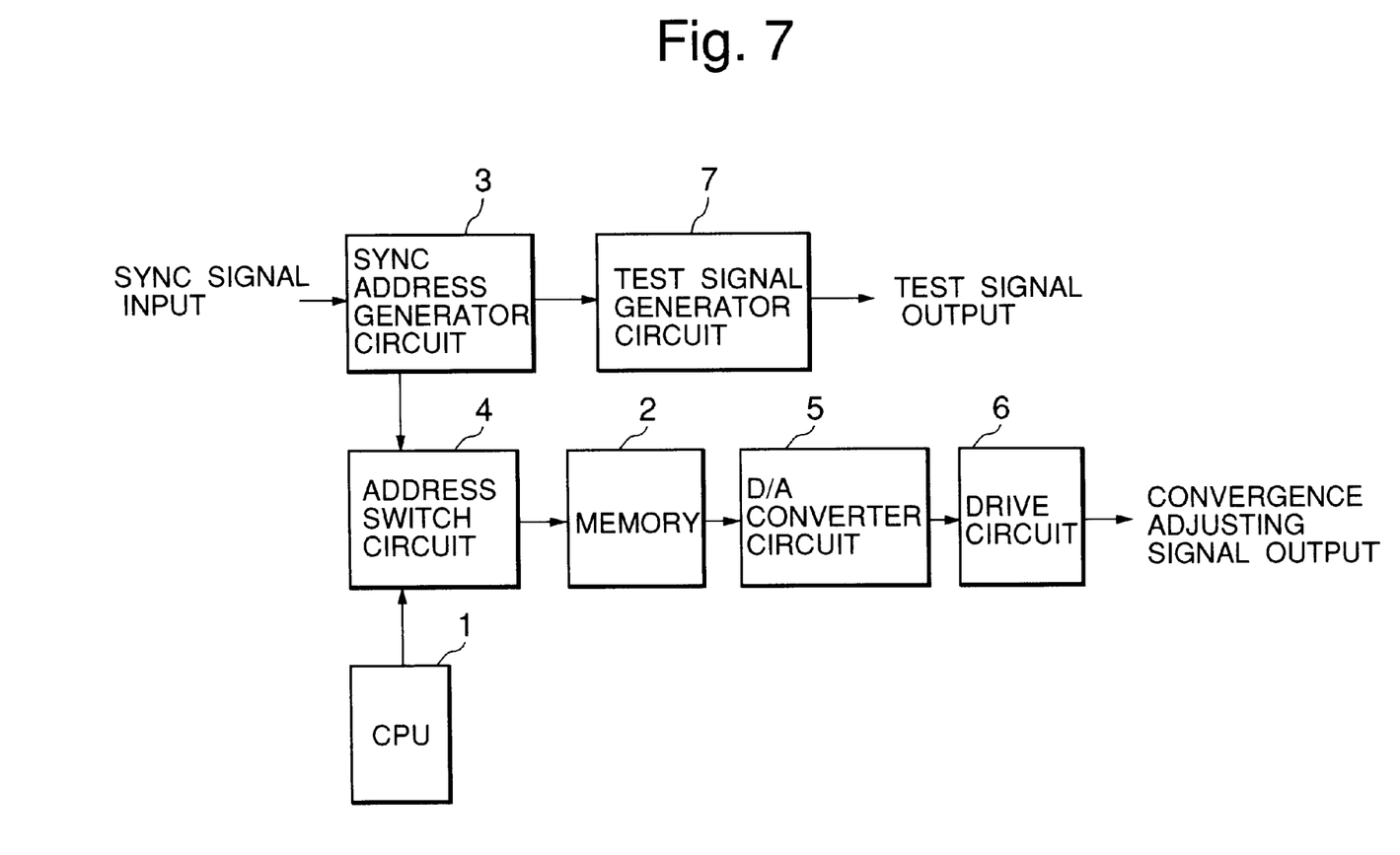
FIG. 7 is a block circuit diagram showing a construction of a conventional convergence adjusting circuit.

FIG. 7 shows a block circuit diagram of a typical example of a conventional digital convergence circuit for a display device.

In FIG. 7, a CPU 1 controls a man-machine interface such as a remote controller and/or a key board to be used in adjusting convergence, and produces convergence correction data to be written in a memory 2 from which the correction data is read out synchronised with a scanning of a display screen of the display device. A sync address generator circuit 3 supplies a sync address to the memory 2. An address switch circuit 4 switches between an address signal for allowing the CPU 1 to access the memory 2 and the sync address output from the sync address generator circuit 3, and supplies selected one of the address signal and the sync address. A D/A converter circuit 5 converts a train of convergence correction data read out from the memory 2 into an analog signal to generate a correction waveform. A drive output circuit 6 amplifies current of the generated convergence correction waveform to drive a convergence yoke of the display device. A test signal generator circuit 7 displays an adjustment pattern showing adjusting points by such as cross-hatching or a cursor during the adjustment of convergence.

In a known method for performing the convergence adjustment easily and precisely by the digital convergence circuit shown in FIG. 7. A convergence adjustment for a selected one of an arbitrary number of adjusting regions obtained by dividing the display screen is performed independently from the other adjusting regions by producing a convergence adjusting signal output. This is done so that the non-selected adjusting regions are not influenced by the convergence adjustment performed for the selected adjusting region.

Here, a point preliminarily set on the screen whose convergence is to be adjusted will be referred to as "adjusting point". Further, a region around the adjusting point of the display screen, which is influenced by the adjustment performed for the adjusting point, will be referred to as "adjusting region".

An example of the adjusting method of the conventional digital convergence circuit of FIG. 7 will be described with reference to a flowchart shown in FIG. 8.

Figure 8:
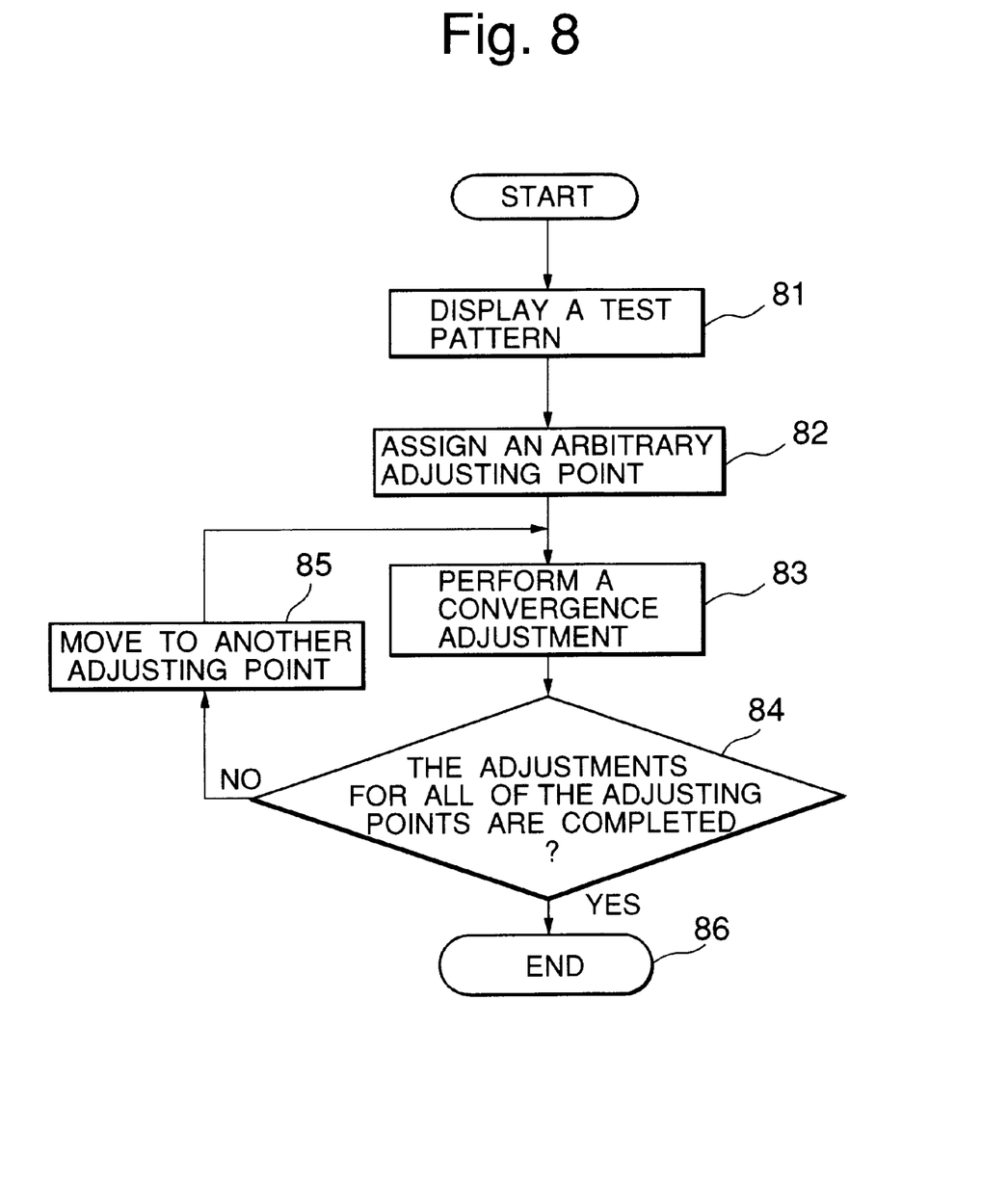
FIG. 8 is a flowchart showing the convergence adjusting method for the conventional convergence adjusting circuit.

In FIG. 8, at first, the address switch circuit 4 connects the CPU 1 to the memory 2. Then, a test pattern, generated by the test signal generator circuit 7, such as cross hatching, indicative of a position of adjusting point on the screen, is displayed on an external display (Step 81).

Then, an arbitrary adjusting point whose convergence is to be adjusted is assigned on the external display by using a pointing means, generated by the test signal generator circuit 7, such as a cursor (Step 82).

Thereafter, a convergence adjustment is performed for the adjusting point by controlling external data given to the CPU 1 (Step 83).

And, after the convergence adjustment for the adjusting point is completed, the cursor is moved to another adjusting point by the test signal generator circuit 7 and a convergence adjustment for the latter point is similarly performed by the CPU 1, and so on (Steps 84 - 85 - 83 . . . ).

After the convergence adjustment for all adjusting points on the screen is completed, the CPU 1 ends the convergence adjustment (Step 84 - 86).

When the external display displays a video signal, the address switch circuit 4 connects the sync address generator circuit 3 to the memory 2. And the memory 2 outputs the written data synchronized with the sync signal output generated by the sync address generator circuit 3. The D/A converter circuit 5 converts the data to an analog signal. The drive circuit 6 amplifies the analog signal to a convergence adjusting signal output of the external display.

The numbers of the adjusting points and the positions thereof on the screen depend upon the circuit construction of the digital convergence circuit. However, it is usual that the adjusting points are set at cross points of a lattice having 10 to 20 horizontal lines and 8 to 16 vertical lines.

Practically, the adjustment is performed by confirming color deviation of respective R, G and B signals while looking at the respective adjusting points and operating the remote controller, etc., such that the R, G and B colors are converged to each of the adjusting points. In this case, since it is easier to adjust convergence of a portion of the display screen in which the color deviation is remarkable, it is usual to randomly select a portion of the screen whose color deviation is the largest currently.

Further, in JP A 60-185482 (published on Sep. 20, 1985), a digital convergence device using a cross-hatching pattern is disclosed and, in JP A 4-109785 (published on Apr. 10, 1992), an image correction circuit using dot pattern or cross-hatching pattern is disclosed.

In JP A 61-269589 (published on Nov. 28, 1986), a device is disclosed in which a convergence adjustment is performed for each of image portions obtained by dividing an image.

In the above mentioned conventional convergence adjusting methods, however, there is a problem that a precise adjustment is difficult. In order to simplify the convergence adjustment, an area of each adjusting region is increased.

On the contrary, when the area of each adjusting region is reduced in order to improve the preciseness of the convergence adjustment, there is another problem that time required for the convergence adjustment is increased.

Further, since, in the conventional method, the adjusting point which is to be practically adjusted is selected randomly, there is a further problem that, when an amount of convergence adjustment is increased, non-continuity distortion tends to occur on the screen.

SUMMARY OF THE INVENTION

The present invention was made to solve the defects of the conventional convergence adjusting method and has an object to provide a convergence adjusting method and a convergence adjusting circuit, with which it is possible to improve the preciseness of convergence adjustment within a reduced time and eliminate non-continuity distortion on a display screen of a display device even if an amount of adjustment is increased.

According to the present invention, the convergence adjusting method for converging R, G and B signals to one point on a display screen includes an adjusting step for sequentially performing convergence adjustment at a plurality of first adjusting points set on the display screen equidistantly from each other and a setting step for setting second adjusting points on the display screen equidistantly from each other with a pitch smaller than a pitch of the first adjusting points. The adjusting step and the setting step are repeated alternately so that the adjusting region is made smaller steppingly.

According to the present invention, there is provided a convergence adjusting circuit for displaying a plurality of adjusting points having convergence to be adjusted on a display screen and performing a convergence adjustment for the adjusting points according to an external instruction. The convergence adjusting circuit has an adjustment state flag memory which stores flags corresponding to first adjusting points displayed on the display screen and indicative of whether or not adjustment for the corresponding first adjusting points is completed. And, the convergence adjusting circuit has a test pattern generator which displays second adjusting points each between adjacent ones of the first adjusting points when the flags indicate a completion of convergence adjustment for all of the first adjusting points, wherein the convergence adjustment for the second adjusting points is performed.

In summary, in a convergence adjusting method according to the present invention, the size of the adjusting region to be adjusted in convergence is steppingly changed corresponding to the progress of convergence adjustment to make a coarse adjustment possible throughout the screen at a start of the convergence adjustment and make a fine adjustment in a selected narrower region or regions of the screen possible immediately before the convergence adjustment is completed.

At the start of convergence adjustment, the convergence adjustment is performed uniformly for the whole display screen efficiently and therefore it is possible to prevent the non-continuity of the correction waveform from occurring. Further, immediately before the convergence adjustment is completed, the fine adjustment is performed in the selected narrower region or regions of the display screen discretely without influence on the remaining regions and therefore it is possible to improve the preciseness of adjustment.

Further, in this method, since it is possible to reduce the amount of correction required for the final fine adjustment, it is possible to restrict an occurrence of the non-continuity of correction waveform which tends to occur in the conventional method.

The progress of convergence adjustment can be known by monitoring whether or not data of the respective adjusting points set preliminarily are changed.

DETAILED DESCRIPTION OF THE PREFERRED EMBODIMENTS

Figure 1:
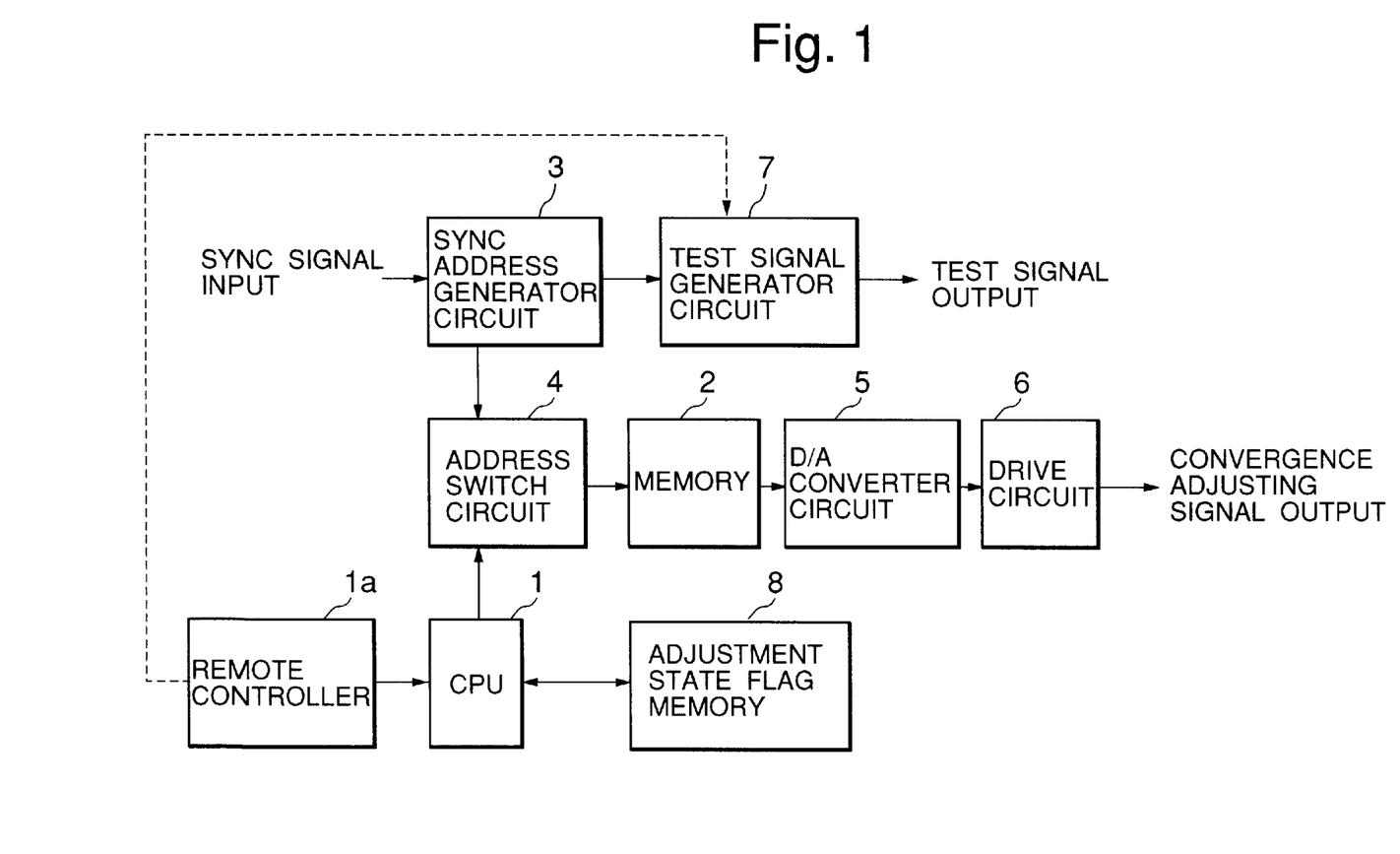
FIG. 1 is a block circuit diagram showing a construction of a convergence adjusting circuit according to an embodiment of the present invention.

FIG. 1 is a block circuit diagram showing a construction of a convergence adjusting circuit according to an embodiment of the present invention. In FIG. 1, components similar to those shown in FIG. 7 are depicted by same reference numerals without details thereof.

In FIG. 1, the convergence adjusting circuit of the present invention differs from the conventional circuit in that an adjustment state flag memory 8 is provided for storing flags indicative of whether or not an adjustment for respective adjusting points is completed.

Figure 2:
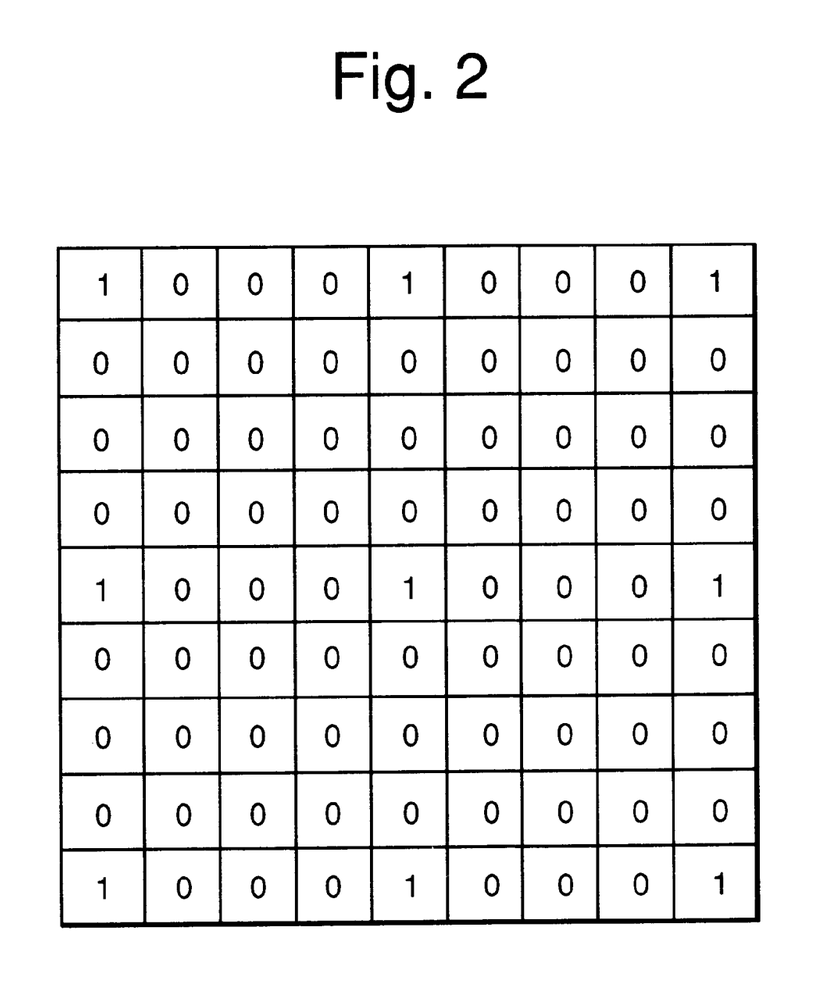
FIG. 2 is a diagram showing a memory content of an adjustment state flag memory in FIG. 1.

FIG. 2 shows a concept of arrangement of data stored in the adjustment state flag memory 8. Addresses of the adjustment state flag memory 8 correspond to the adjusting points on a display screen respectively and flags, each indicative of whether or not convergence adjustment for the corresponding adjusting point is completed, are stored in the corresponding addresses of the memory 8. In the shown case, the flag "1" shows a state in which the adjustment is completed and the flag "0" shows a state in which the adjustment is not completed as yet.

Now, the adjusting method of the present invention will be described. In order to simplify the description, the adjusting points which will be referred to as "first" adjusting points hereinafter are arranged on the display screen in a 9×9 matrix or lattice.

Figure 3:
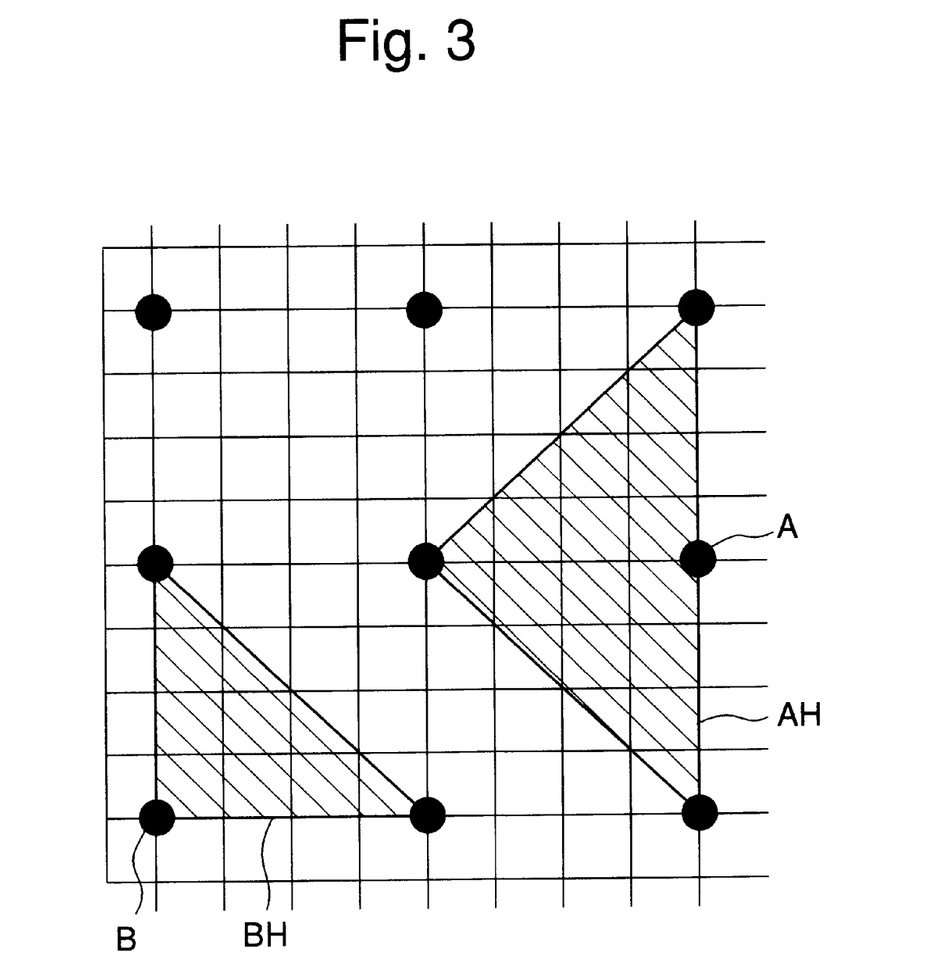
FIG. 3 is a diagram illustrating an arrangement of adjusting points set at a start of a convergence adjustment and adjusting regions.

At a start of a coarse convergence adjustment, the first adjusting points initially set on the display screen and adjusting regions whose convergence are influenced when the coarse convergence adjustment is performed for the first adjusting points are set as shown in FIG. 3.

As shown in FIG. 3, the adjusting region of a certain first adjusting point (indicated by a black circle) is defined by the certain first adjusting point and adjusting points adjacent to the certain first adjusting point. That is, for example, the adjusting region of the first adjusting point A is indicated by a hatched area AH and the adjusting region of the first adjusting point B is indicated by a hatched area BH.

First, an arbitrary one of the first adjusting points on the display screen is selected by pointing it by a cursor by using the remote controller 1a connected to the test signal generator circuit 7 indicated as a dotted line, etc., and the convergence adjustment is performed by the remote controller 1a, the CPU 1, the address circuit 4, the memory 2, the D/A converter 5 and the drive circuit 6 for the selected first adjusting point. After the convergence adjustment for this first point is completed, a flag generated by the CPU 1 is set in an address of the adjustment state flag memory 8 corresponding to the first adjusting point and, simultaneously therewith, the cursor is moved to another arbitrary first adjusting point by controlling the remote controller 1a for which an adjustment is to be performed next.

Then, after the coarse convergence adjustment for the next first adjusting point completes, a flag is similarly set in an address of the adjustment state flag memory 8 corresponding to the next first adjusting point and the cursor is further moved to a further arbitrary first adjusting point for which an adjustment is to be performed subsequently.

The setting of the flags in the adjustment state flag memory 8 may be performed manually by informing the CPU 1 of a completion of adjustment through the remote controller 1a, etc., when an operator confirms the completion of the coarse convergence adjustment at a certain adjusting point or may be automatically performed simultaneously with a movement of the cursor after a non-consistence of convergence correction data is detected by comparing the convergence correction data before the adjustment with that after the adjustment.

The coarse adjustment for the whole display screen is completed by executing convergence adjustment for each of the adjusting points on the display screen. In this embodiment, in order to achieve the coarse adjustment, the convergence adjustment is performed for each of nine first adjusting points (indicated by a black circle).

Figure 4:
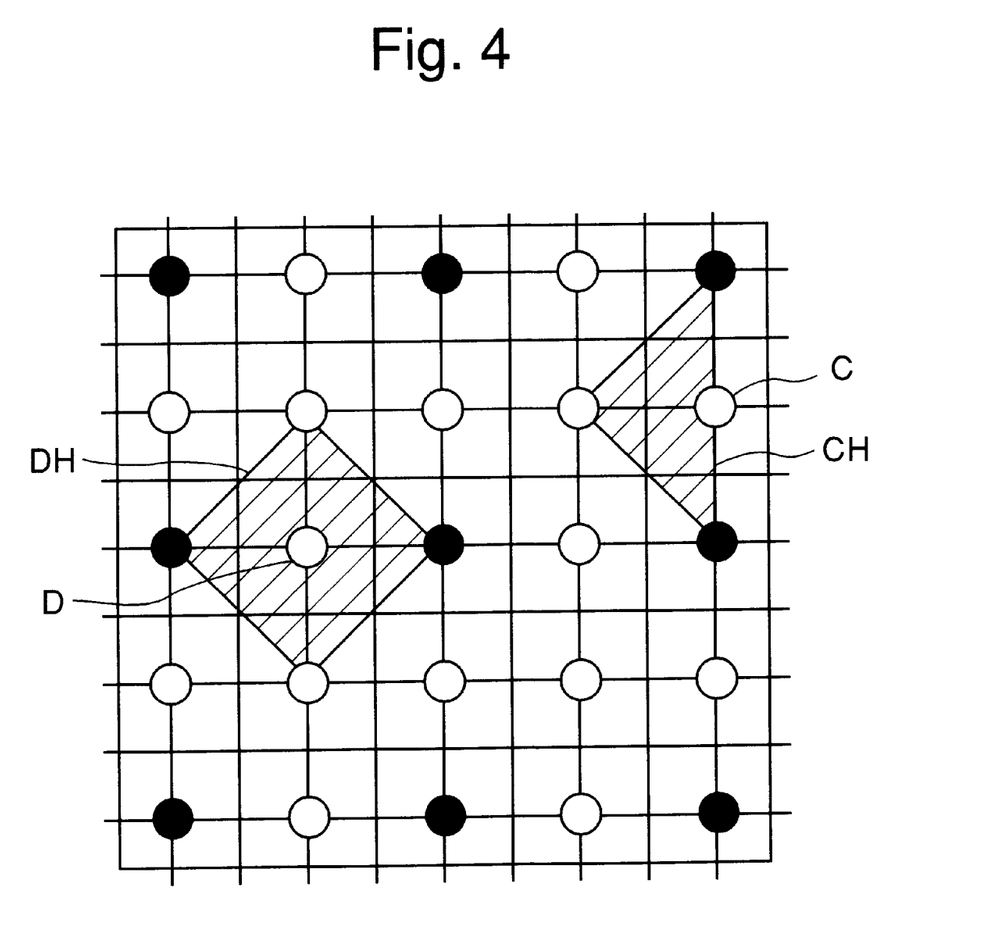
FIG. 4 is a diagram illustrating an arrangement of adjusting points, added after the convergence adjustment for the adjusting points shown in FIG. 3 is completed, and adjusting regions.

When the coarse convergence adjustment is performed for all of the preliminarily set first adjusting points and flags corresponding to the respective first adjusting points are set in the respective addresses of the adjustment state flag memory 8, new adjusting points, which will be referred to as "second" adjusting points hereinafter, are added to intermediate positions between adjacent ones of the first adjusting points, respectively, as shown in FIG. 4.

The adjusting region of the second adjusting point is defined by the first adjusted points adjacent thereto and adjacent second adjusting points. That is, for example, the adjusting region of the second adjusting point C is indicated by a hatched area CH and the adjusting region of the second adjusting point D is indicated by a hatched area DH. In this embodiment, the newly added second adjusting points are indicated by white circles and the number thereof is 16.

Figure 5:
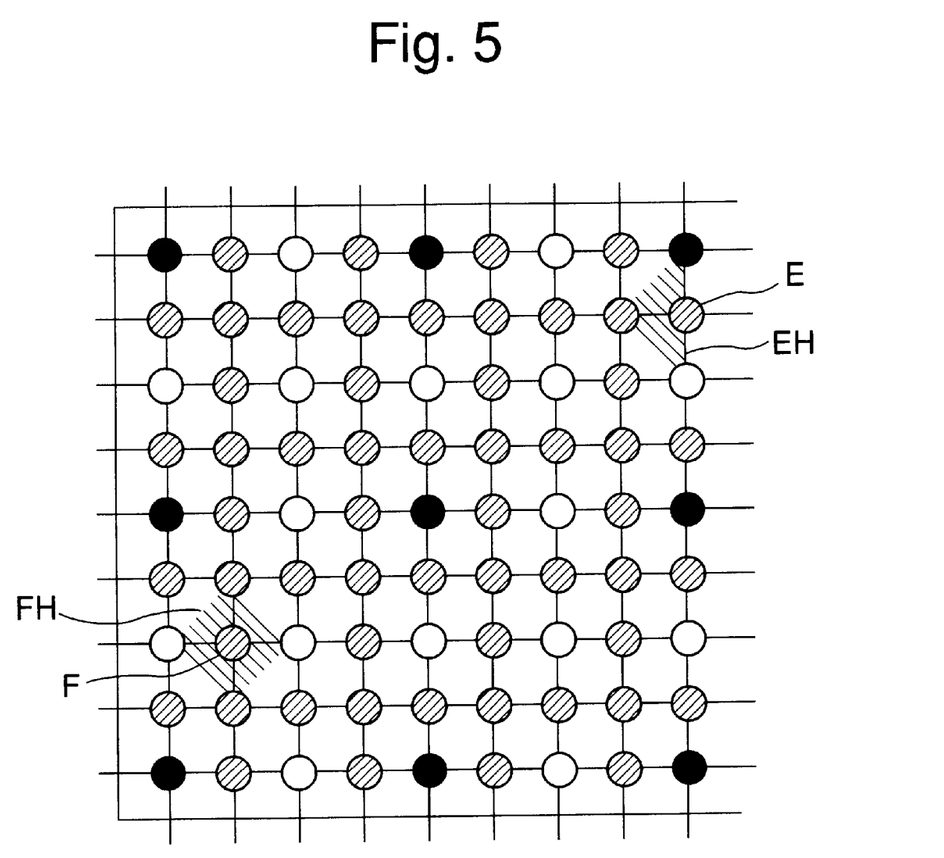
FIG. 5 is a diagram illustrating an arrangement of adjusting points, further added after the convergence adjustment for the adjusting points shown in FIG. 4 is completed, and adjusting regions.

When the convergence adjustment is performed for all of the newly added second adjusting points and flags corresponding to the respective second adjusting points are set in the respective addresses of the adjustment state flag memory 8, newer adjusting points, which will be referred to as "third" adjusting points hereinafter, are similarly added to intermediate positions between adjacent ones of the second adjusting points, respectively, as shown in FIG. 5.

The adjusting region of the third adjusting point is also defined by the adjacent adjusted ones of the second adjusting points and third adjusting points. Thus, the adjusting region is gradually made finer. That is, for example, the adjusting region of the third adjusting point E is indicated by a hatched area EH and the adjusting region of the third adjusting point F is indicated by a hatched area FH. In this embodiment, the newly added third adjusting points are indicated by hatched circles and the number thereof is 56.

It is possible, when the convergence adjustment is performed for all of the third adjusting points and flags corresponding to the respective third adjusting points are set in the respective addresses of the state flag memory 8, to make the adjusting region finer by adding adjusting points each between adjacent ones of the third adjusting points whose convergence are adjusted. In this embodiment, however, it is assumed that the finest adjusting region is achieved with the number of and the arrangement of the adjusting points shown in FIG. 5, for simplicity of description.

The limitation of finest adjusting region depends upon the hardware of the digital convergence circuit and is, of course, varied with different specifications of the hardware.

Further, in this embodiment, the convergence adjustment is performed through three steps as shown in FIGS. 3, 4 and 5, respectively. However, the number of steps is not limited to three. The adjusting region can be more fractionalized by increasing the number of steps within a limitation dependent upon the hardware so that a more precise adjustment becomes possible.

In FIGS. 3, 4 and 5, the finest lattice shown in FIG. 5 is preliminarily displayed on the display screen and the three sets of adjusting points marked by the black circles, white circles and hatched circles, respectively, are displayed on cross points of the lattice. However, the display system of adjusting points is not limited to this.

That is, although, in FIGS. 3 to 5, the first, second and third adjusting points are displayed by the different circles, respectively, it is possible to display these adjusting points by using other marks such as square or triangular marks. Alternatively, it is possible to display adjusting points which are to be adjusted by a specific mark such as black circle and display adjusting points which were adjusted already by another mark such as white circle.

Alternatively, it is possible to sequentially display lattice patterns having different fineness corresponding to the respective steps and use cross points of each lattice pattern as adjusting points, without using any mark. That is, since the number of adjusting points in the case shown in FIG. 3 is 9, cross points of the 3×3 lattice pattern is used as adjusting points. Similarly, in the case shown in FIG. 4, the 5×5 lattice pattern is used and, in the case shown in FIG. 5, the 9×9 lattice pattern is used.

The display of the lattice patterns on the display screen is performed by generating various patterns in the test signal generator circuit 7. For example, a lattice pattern can be displayed on the display screen by reading out a vertical line pattern and a horizontal line pattern of the lattice pattern, which are preliminarily stored, a predetermined number of times corresponding to a required fineness of the lattice pattern, respectively. In the case shown in FIG. 3, for example, the vertical line pattern and the horizontal line pattern are read out three times, respectively, and displayed on the display screen. A pattern of specific marks to be used on the thus displayed lattice pattern is also preliminarily stored and read out similarly.

Now, the method will be described with reference to a flowchart shown in FIG. 6.

Figure 6:
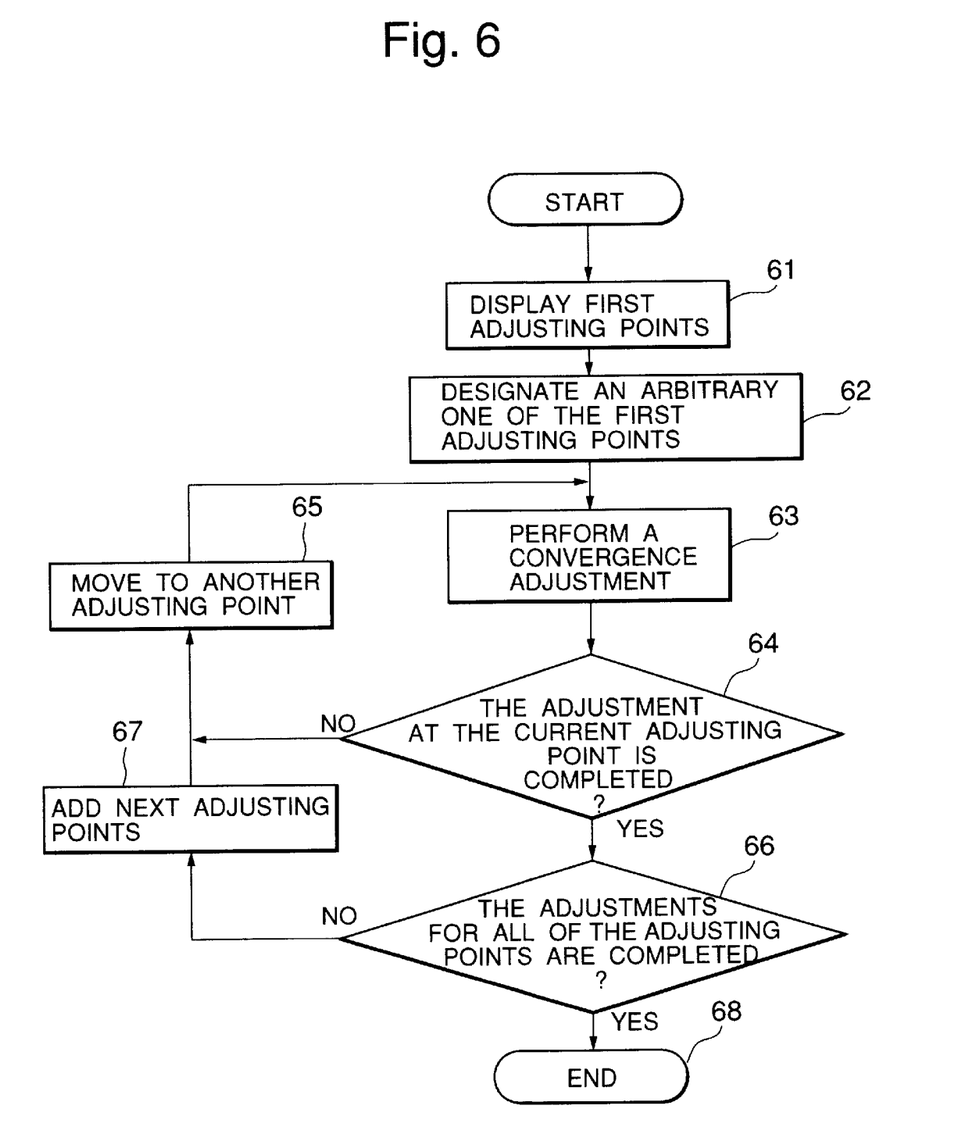
FIG. 6 is a flowchart showing a convergence adjusting method according to an embodiment of the present invention.

In FIG. 6, at first, the address switch circuit 4 connects the CPU 1 to the memory 2. Then, the test pattern generator 7 generates first adjusting points according to timing of a sync address output of the sync address generator circuit 3, that is, those points shown in FIG. 3. And the first adjusting points are displayed on an external display (Step 61).

Then, the test pattern generator 7 desinates an arbitrary one of the first adjusting points, which is to be adjusted, by a position designating means such as a cursor generated by the test patten generator 7 (Step 62).

Thereafter, a convergence adjustment is manually performed at the designated adjusting point by controlling a data which is given to the CPU 1. The data is written in the memory 2 to an address corresponding to the first adjusting points. The D/A converter 5 converts the data to analog value. The drive circuit 6 amplifies the value to be convergence control signals of the external display as a convergence adjusting signal output (Step 63).

And when the adjustment is completed, the CPU 1 writes a datum "1" to an address corresponding to the adjusting point in the adjusting state flag memory 8, and the cursor is moved to another first adjusting point pointed by the test signal generator ciruit 7 and the convergence adjustment for the latter adjusting point is performed (Steps 64 - 65 - 63 . . . ).

After the convergence adjustment for all of the first adjusting points is completed, the second adjusting points are added to the lattice pattern generated by the test signal generator circuit 7 (Step 64 - 66 - 67).

In the step 67, the pattern of specific marks is added and the fineness of the lattice pattern is changed by the test signal generator circuit 7 as mentioned previously.

Then, the convergence adjustment for the second adjusting points thus added is similarly performed by the CPU 1 (Steps 65 - 63 - 64 . . . ).

After the convergence adjustment for all of the second adjusting points is completed, the third adjusting points are added by the test signal generator circuit 7 (Step 64 - 66 - 67).

And the convergence adjustment for the third adjusting points is similarly performed by the CPU 1 (Steps 65 - 63 - 64 . . . ).

After the convergence adjustment for the third adjusting points is completed, the CPU 1 completes the adjustment operation (Steps 66 - 68).

When the external display displays a video signal, the address switch circuit 4 connects the sync address generator circuit 3 to the memory 2. And the memory 2 outputs the written data in synchronism with the sync signal output generated the sync address generator circuit 3. The D/A converter circuit 5 converts the data to an analog signal. The drive circuit 6 amplifies the analog signal to a convergence adjusting signal output of the external display.

In summary, in the convergence adjusting method according to the present invention, the adjusting step for sequentially performing convergence adjustment at a plurality of first adjusting points set on the display screen equidistantly and the setting step for setting second adjusting points on the display screen equidistantly with a pitch smaller than a pitch of the first adjusting points are alternatively repeated. Therefore, it is possible to uniformly adjust the whole display screen at the coarse adjustment in the initial stage of the convergence adjustment, substantially reduce the time required for the adjustment and prevent the non-continuity distortion due to the adjustment from occurring.

In the final stage of the convergence adjustment, it is possible to easily perform the highly precise adjustment and minimize the non-continuity distortion by minimizing the adjusting region.

Further, the newly added adjusting points to the plurality of the current adjusting points may be arranged intermediate between adjacent ones of the current adjusting points set on the display screen equidistantly from each other.

The adjusting points may be set on the cross points of the lattice pattern displayed on the display screen.

As described, according to the convergence adjusting method of the present invention, it is possible to uniformly adjust the whole display screen at the coarse adjustment in the initial stage of the convergence adjustment, substantially reduce the time required for the adjustment and prevent the non-continuity distortion due to the adjustment from occurring, by alternatively repeating the adjusting step for sequentially performing convergence adjustment at a plurality of first adjusting points set on the display screen equidistantly and the setting step for setting second adjusting points on the display screen equidistantly with a pitch smaller than a pitch of the first adjusting points are alternatively repeated.

Further, in the final stage of the convergence adjustment, it is possible to easily perform the highly precise adjustment by minimizing the adjusting region.

Further, there is an effect that the non-continuity distortion can be kept small.

What is claimed is:

1. A convergence adjusting method for converging R, G and B signals to one point on a display screen, comprising:
   sequentially performing convergence adjustment at a plurality of adjusting points set on the display screen equidistantly; and
   setting new adjusting points on the display screen equidistantly with a pitch smaller than a pitch of the adjusting points, wherein the sequential performing of convergence adjustment and the setting of new adjusting points are repeated, alternately, until the pitch of the new adjusting points becomes small to obtain a desired preciseness of convergence adjustment.

2. The convergence adjusting method as claimed in claim 1, wherein the adjusting points and the new adjusting points are positioned at cross points of a lattice pattern, and the lattice pattern is preliminarily displayed and the adjusting points and the new adjusting points are displayed by marks on cross points of the lattice pattern.

3. The convergence adjusting method as claimed in claim 2, wherein the lattice pattern is displayed by reading out a preliminarily stored pattern of vertical lines and horizontal lines a number of times corresponding to a fineness of the lattice pattern.

4. The convergence adjusting method as claimed in claim 2, wherein the adjusting points which are to be adjusted are displayed with a mark having a specific shape and the adjusting points which are already adjusted are displayed with another mark.

5. The convergence adjusting method as claimed in claim 4, wherein a pattern of the marks having the specific shape is preliminarily stored and read out a plurality of times corresponding to a fineness of the lattice pattern.

6. The convergence adjusting method as claimed in claim 1, wherein lattice patterns having different fineness corresponding to respective stages of convergence adjustment are displayed sequentially and cross points of the lattice patterns are used as the adjusting points.

7. The convergence adjusting method as claimed in claim 6, wherein a pattern of vertical lines and horizontal lines is preliminarily stored and a lattice pattern is displayed by reading out the pattern of vertical lines and horizontal lines a plurality of times corresponding to a fineness of the lattice pattern.

8. The convergence adjusting method as claimed in claim 1, wherein each of the adjusting points defines, together with adjusting points adjacent thereto, an adjusting region.

9. A convergence adjusting circuit for displaying a plurality of adjusting points having convergence to be adjusted on a display screen and performing convergence adjustment for the adjusting points according to an external instruction, the circuit comprising:

means for storing flags corresponding to each of the adjusting points displayed on said display screen and indicative of whether or not a convergence adjustment for the corresponding adjusting points is completed; and means for generating new adjusting points, with a pitch smaller than a pitch of the adjusting points, and set equidistantly between adjacent ones of the adjusting points when the flags indicate a completion of convergence adjustment for the adjusting points.

10. The convergence adjusting circuit as claimed in claim 9, wherein said generating means is adapted to preliminarily display a lattice pattern and to display the adjusting points on the cross points of the lattice pattern by using marks.

11. The convergence adjusting circuit as claimed in claim 10, wherein said generating means is adapted to preliminarily store a pattern of vertical lines and horizontal lines of the lattice pattern and to read out the pattern of vertical lines and horizontal lines a plurality of times corresponding to a fineness of the lattice pattern.

12. The convergence adjusting circuit as claimed in claim 10, wherein said generating means is adapted to display current adjusting points which are to be adjusted with a first mark and to display adjusting points which are adjusted with a second mark.

13. The convergence adjusting circuit as claimed in claim 12, wherein said generating means is adapted to preliminarily store a pattern of vertical lines and horizontal lines of a lattice pattern and to read out the pattern of vertical lines and horizontal lines a plurality of times corresponding to a fineness of the lattice pattern.

14. The convergence adjusting circuit as claimed in claim 9, wherein said generating means is adapted to sequentially display a plurality of lattice patterns having different fineness corresponding to respective stages of convergence adjusting and to make cross points of individual lattice patterns of the plurality of lattice patterns as the adjusting points of respective stages.

15. The convergence adjusting circuit as claimed in claim 14, wherein said generating means is adapted to preliminarily store a pattern of vertical lines and horizontal lines of a lattice pattern and to read out the pattern of vertical lines and horizontal lines a plurality of times corresponding to a fineness of the lattice pattern.

16. The convergence adjusting circuit as claimed in claim 9, wherein each of the adjusting points defines, together with adjusting points adjacent thereto, an adjusting region.

17. A convergence adjusting circuit, comprising:

correction data generating means for generating a convergence correction data;

a memory for storing the correction data generated as a result of convergence adjustment, the correction data stored in said memory being read out therefrom synchronized with a scan of a display screen;

a sync address generator circuit for generating a sync address synchronized with the scan of the display screen and supplying the sync address to said memory;

an address switching circuit for switching between an address signal for an access by said correction data generating means to said memory and the sync address output from said sync address generator circuit and supplying one of said address signal and said sync address to said memory;

a D/A converter circuit for converting a train of the correction data read out from said memory into an analog signal and generating a convergence correction waveform;

a test signal generator circuit for displaying an adjusting pattern indicative of the respective adjusting points during a convergence adjusting period; and an adjustment state flag memory for storing flags indicative of whether the adjustment of the respective adjusting points is completed; and a CPU for generating new adjusting points, with a pitch smaller than a pitch of adjusting points, when flags indicate a completion of convergence adjustment for the adjusting points.

18. The convergence adjusting method as claimed in claim 2, wherein each set of new adjusting points, together with all previous adjusting points, consists of all of the cross points of a lattice.

19. The convergence adjusting circuit as claimed in claim 14, wherein each individual lattice pattern is a subset of a lattice pattern used for a succeeding respective stage of convergence adjusting, and each adjusting point is positioned at a cross point of a current lattice pattern and at a cross point of each lattice pattern used for one of the succeeding respective stages of convergence adjusting.

20. The convergence adjusting circuit as claimed in claim 17, wherein each set of new adjusting points, together with all previous adjusting points, consists of all of the cross points of a lattice.

21. The convergence adjusting circuit as claimed in claim 17, wherein the new adjusting points are set equidistantly between adjacent ones of the adjusting points.

22. A convergence adjusting circuit for displaying a plurality of adjusting points having convergence to be adjusted on a display screen and performing convergence adjustment for the adjusting points according to an external instruction, the circuit comprising:

a memory to store flags corresponding to each of the adjusting points displayed on said display screen and indicative of whether or not a convergence adjustment for the corresponding adjusting points is completed; and a processor to generate new adjusting points, with a pitch smaller than a pitch of the adjusting points, when the flags indicate a completion of convergence adjustment for the adjusting points.

* * * * *